United States Patent
Sato

(10) Patent No.: US 8,956,095 B2
(45) Date of Patent: Feb. 17, 2015

(54) TWO-PIECE CLIP

(75) Inventor: Takehiro Sato, Toyota (JP)

(73) Assignee: Nifco Inc., Yokohama-shi, Kanagawa (JP)

( * ) Notice: Subject to any disclaimer, the term of this patent is extended or adjusted under 35 U.S.C. 154(b) by 487 days.

(21) Appl. No.: 13/383,768

(22) PCT Filed: Jul. 13, 2010

(86) PCT No.: PCT/JP2010/061846
§ 371 (c)(1),
(2), (4) Date: Feb. 6, 2012

(87) PCT Pub. No.: WO2011/007781
PCT Pub. Date: Jan. 20, 2011

(65) Prior Publication Data
US 2012/0174354 A1    Jul. 12, 2012

(30) Foreign Application Priority Data

Jul. 15, 2009   (JP) .................. 2009-166841

(51) Int. Cl.
F16B 13/06    (2006.01)
F16B 19/10    (2006.01)
(52) U.S. Cl.
CPC ................ F16B 19/1081 (2013.01)
USPC ............................ 411/45; 24/458
(58) Field of Classification Search
CPC ............ F16B 19/1081; F16B 19/1054; F16B 13/0858; F16B 13/066; F16B 37/065; F16B 5/0642; F16B 13/124; F16B 13/126; F16B 5/0628; F16B 5/123; F16B 5/065; F16B 5/0657; F16B 21/086; F16B 2/241; E21D 21/008; E21D 21/00; B62D 27/06; B60R 13/0206

USPC .......................... 411/41, 45–48; 24/297, 458
See application file for complete search history.

(56) References Cited

U.S. PATENT DOCUMENTS

| 4,927,287 | A  | * | 5/1990  | Ohkawa et al. ................. 411/41 |
| 6,769,849 | B2 |   | 8/2004  | Yoneoka |
| 2002/0094253 | A1 | * | 7/2002  | Enomoto et al. ............... 411/41 |
| 2004/0091334 | A1 |   | 5/2004  | Hoshi |
| 2005/0019130 | A1 | * | 1/2005  | Kanie et al. ..................... 411/45 |
| 2007/0172327 | A1 | * | 7/2007  | Hansen ............................ 411/41 |
| 2007/0253794 | A1 | * | 11/2007 | Zhang et al. ................... 411/45 |
| 2009/0028659 | A1 |   | 1/2009  | Shibuya |
| 2013/0287517 | A1 | * | 10/2013 | Fujiwara ...................... 411/54.1 |

FOREIGN PATENT DOCUMENTS

| JP | 10-030622 | 2/1998 |
| JP | 2004-019671 | 1/2004 |
| JP | 2004-263811 | 9/2004 |

* cited by examiner

*Primary Examiner* — Gay Ann Spahn
(74) *Attorney, Agent, or Firm* — Manabu Kanesaka

(57) ABSTRACT

A clip includes a grommet and a pin. The grommet includes a flange part; a leg part extending in cylindrical form from a lower face of the flange part; an insertion hole running through the leg part from the flange part and allowing insertion of the pin; and slits dividing the leg part into a plurality of divided pieces capable of expanding. The pin includes a head part having a larger outer diameter than the insertion hole; and a shaft part extending from a lower face of the head part, for expanding the divided pieces by being inserted into the insertion hole. The shaft part is provided with a provisional fastening part projecting to curve outwardly in a radial direction on a tip part thereof, for elastically contacting with an inner edge part on an upper face of the opening of the insertion hole.

7 Claims, 13 Drawing Sheets

TWO-PIECE CLIP

TECHNOLOGICAL FIELD

This invention relates to a two-piece clip, in which the structure can be simplified by providing a provisional fastening part only on a pin, so that a force of insertion of the pin can be reduced.

BACKGROUND TECHNOLOGY

Conventionally, there is known a fastening tool, in which a projection for provisional fastening is provided on a hole edge of an insertion hole of a grommet to project toward the inside of the insertion hole, and an elastic arm part to be elastically caught on the aforementioned projection is provided on a tip part of a shaft part of a pin (for example, see paragraph [0016] and FIG. 4 of Patent Document 1).

Specifically, the projection for provisional fastening on the grommet is elastically caught between a base of the elastic arm part of the pin and a projection positioned below (for example, see paragraph [0016] and FIG. 4 of Patent Document 1).

PRIOR ART DOCUMENTS

Patent Documents

Patent Document 1: Japanese Unexamined Patent Publication No. 2004-263811

OUTLINE OF THE INVENTION

Problems to be Solved by the Invention

However, in the aforementioned conventional fastening tool, there is a problem that the elastic arm part and the projection positioned below both must bend in order to elastically catch the projection for provisional fastening on the grommet between the base of the elastic arm part of the pin and the projection positioned below, and a force of insertion of the pin may be increased.

The present invention was created in consideration of the abovementioned problem of the prior art, and an object thereof is that the provisional fastening part should bend, so that the force of insertion of the pin can be reduced.

Means for Solving the Problems

The present invention was created in order to achieve the abovementioned objects, and the present invention has the following characteristics.

Firstly, the present invention is a two-piece clip comprising a grommet and a pin.

Secondly, the grommet has the following configuration.
(1) Flange Part
(2) Leg Part
The leg part extends in cylindrical form from a lower face of the flange part.
(3) Insertion Hole
The insertion hole runs through the leg part from the flange part and allows insertion of the pin.
(4) Slits
The slits divide the leg part into a plurality of divided pieces capable of expanding.
Thirdly, the pin has the following configuration.
(5) Head Part
The head part has a larger outer diameter than the insertion hole.
(6) Shaft Part
The shaft part extends from a lower face of the head part, and is used for expanding the divided pieces by being inserted into the insertion hole.

Fourthly, the shaft part is provided with a provisional fastening part projecting to curve outwardly in a radial direction on a tip part thereof, for elastically contacting with an inner edge part on an upper face of the opening of the insertion hole.

The present invention may be characterized by the following point.

An upper end part of the provisional fastening part is continuous with the shaft part, and a lower end part thereof serves as a free end part. The provisional fastening part can then be made easier to bend by providing the free end part on the provisional fastening part.

The present invention may be characterized by the following point.

A space part, into which the provisional fastening part is allowed to bend, is provided between an inside face of the provisional fastening part and an outer perimeter face of the shaft part. The provisional fastening part can then bend into the space part.

The present invention may be characterized by the following point.

A timing for release of provisional fastening, in which the provisional fastening part moves away from the inner edge part of the insertion hole, when the pin is pushed into the insertion hole from a provisionally fastened state in which the provisional fastening part has contacted the inner edge part on the upper face of the opening of the insertion part, and a timing for expanding, in which the divided pieces expand, being pushed by the shaft part advancing toward a depth inside the insertion hole, are set to be simultaneous, or are set so that the timing for expanding is started earlier than the timing for release of provisional fastening. The movement from the provisionally fastened state to a fully fastened state can then be performed quickly and smoothly.

The present invention may be characterized by the following point.

A total length of the shaft part is set so that end faces of tip parts of the divided pieces align with an end face of the tip part of the shaft part in a state in which the shaft part is inserted inside the insertion hole and the divided pieces are caused to expand. The pin can then be prevented from jumping out from the grommet after fastening.

Space saving can therefore be accomplished by reduction of a space under the plate on the side where the leg part of the grommet projects.

Effect of the Invention

According to the present invention, the provisional fastening part should bend, and the force of insertion of the pin can be reduced.

EMBODIMENT OF THE INVENTION (Two-Piece Clip 10)

Figure 1:
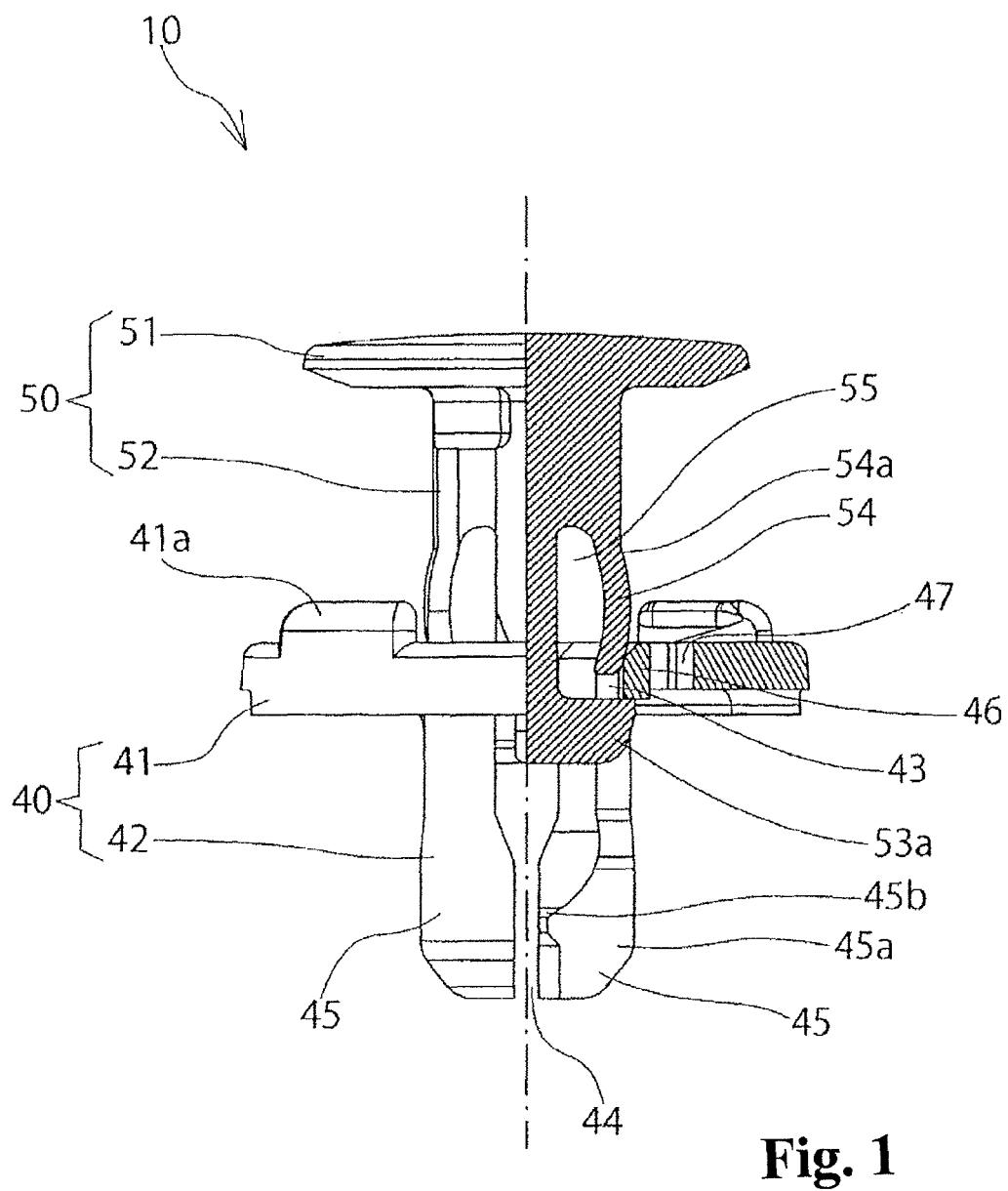
FIG. 1 is a side view in half section of a clip in which a pin is provisionally fastened.
Figure 12:
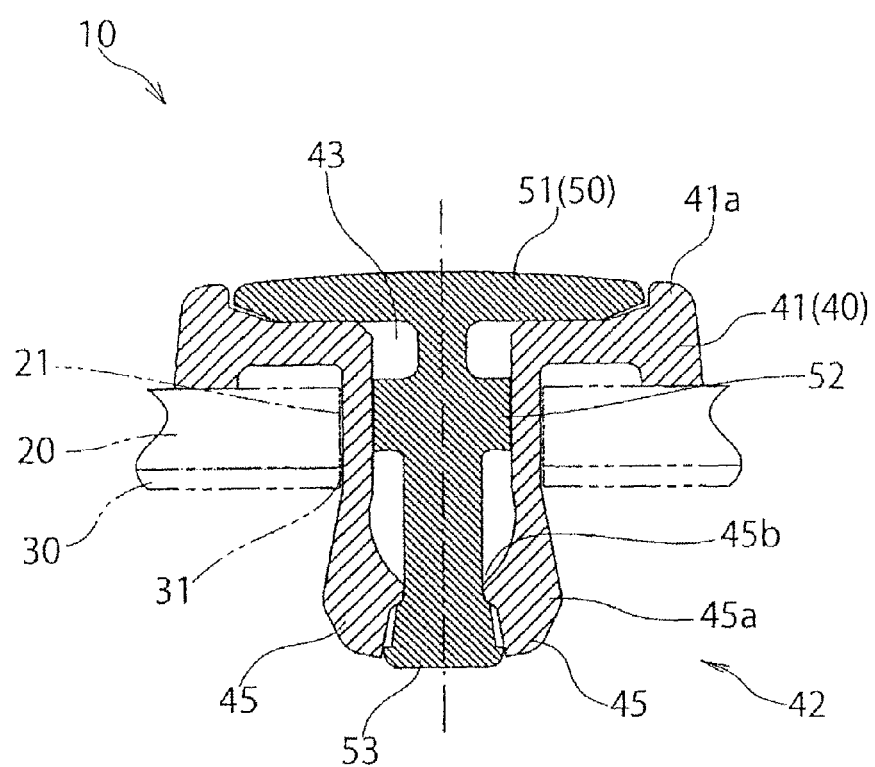
FIG. 12 is a cross-sectional view along the line 12-12 in FIG. 11.
Figure 13:
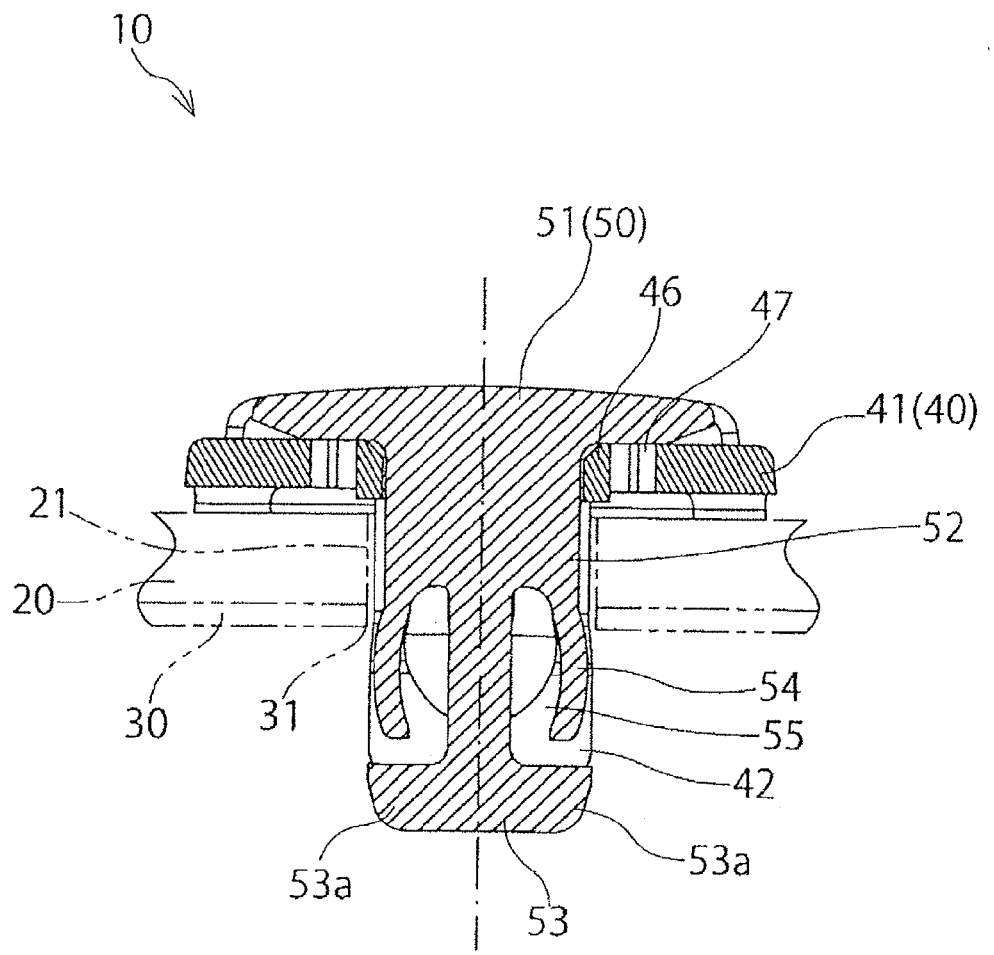
FIG. 13 is a cross-sectional view along the line 13-13 in FIG. 11.

In FIG. 1, the reference numeral "10" indicates a two-piece clip. This clip 10 is used for fastening a fastened member 20, being an automotive part, to a panel 30, being a body, or the like, as illustrated in FIGS. 12 and 13.

Although an automobile is given as an example as a place for use of the clip 10, the invention is not limited to this, and the place may be on a train, ship, airplane, or other passenger vehicle, or it may be a building, furniture, home electronic product, office equipment, or the like.

The clip 10, broadly divided, has the following parts, as illustrated in FIG. 1.

The following (1) and (2) are to be described. Also, the parts of the clip 10 are not limited to the following (1) and (2).

(1) Grommet 40
(2) Pin 50

The pin 50 is used for expanding the grommet 40 in diameter by being inserted inside the grommet 40, as illustrated in FIGS. 12 and 13.

(Fastened Member 20 and Panel 30)

Installation holes 21 and 31 are provided respectively on the fastened member 20 and the panel 30, running through top to bottom, for inserting the grommet 40, as illustrated in FIGS. 12 and 13. Both installation holes 21 and 31 are mutually aligned in a state in which the fastened member 20 and the panel 30 are overlaid, and the grommet 40 is inserted consecutively.

(Grommet 40)

The grommet 40 is inserted consecutively into both installation holes 21 and 31, as illustrated in FIGS. 12 and 13. The grommet 40 is integrally molded, for example, with a synthetic resin having a suitable degree of elasticity and rigidity.

Figure 4:
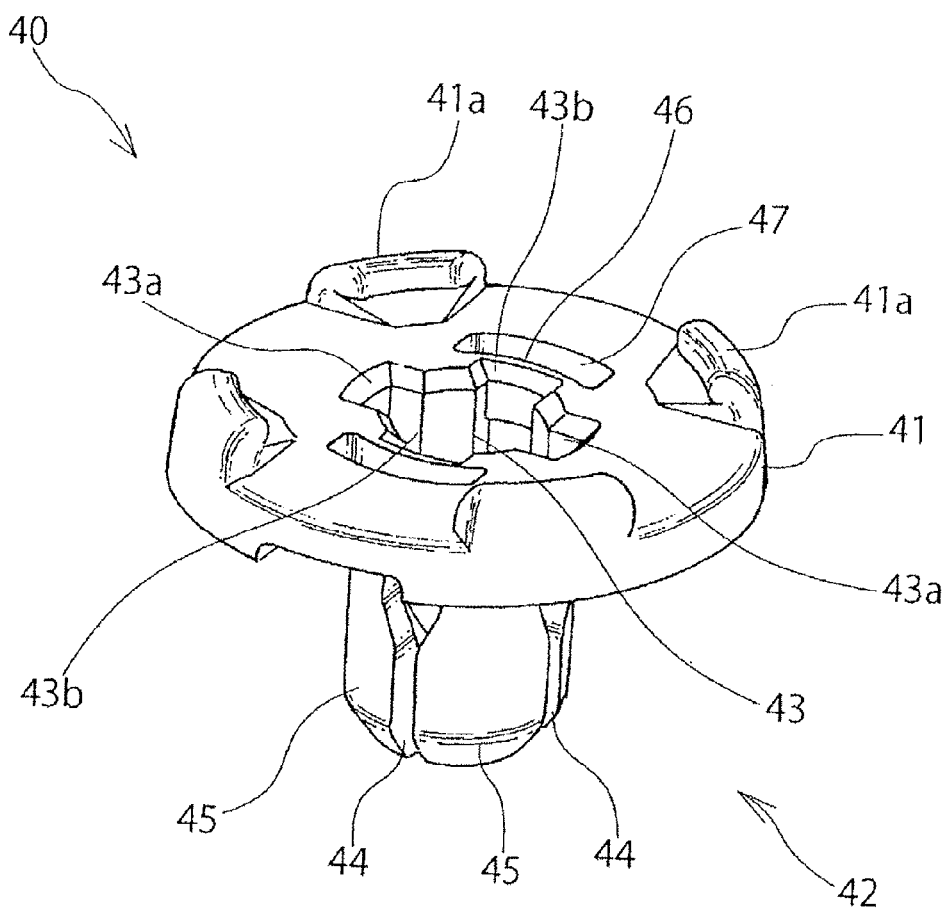
FIG. 4 is a perspective view of a grommet.
Figure 5:
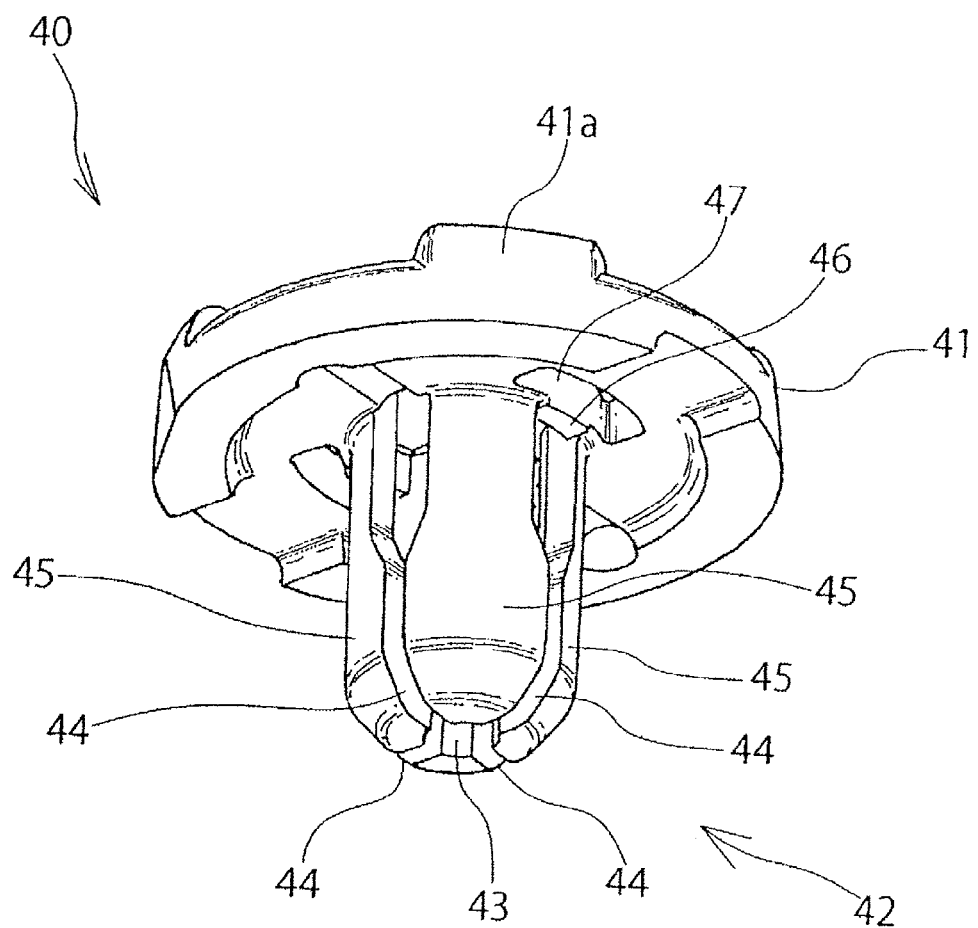
FIG. 5 is another perspective view viewing the grommet from below.
Figure 6:
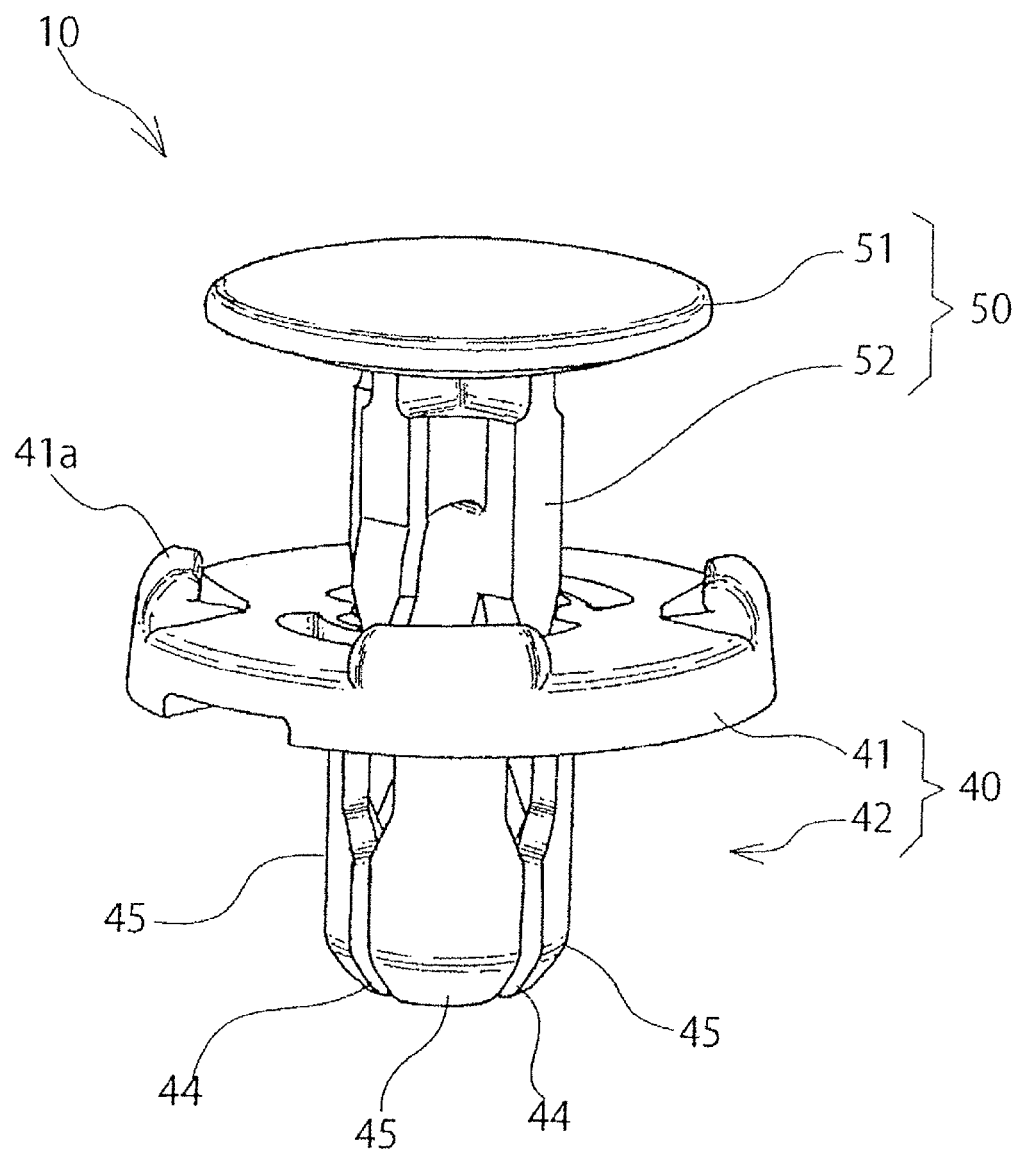
FIG. 6 is a perspective view of the clip in a state in which the pin is provisionally fastened.

Specifically, the grommet 40, broadly divided, has the following parts, as illustrated in FIGS. 4 and 5.

The following (1) to (6) are to be described.

(1) Flange Part 41
(2) Leg Part 42
(3) Insertion Hole 43
(4) Slits 44
(5) Divided Pieces 45
(6) Elastic Projecting Edge Part 46

The parts of the grommet 40 are not limited to the abovementioned (1) to (6).

(Pin 50)

Figure 2:
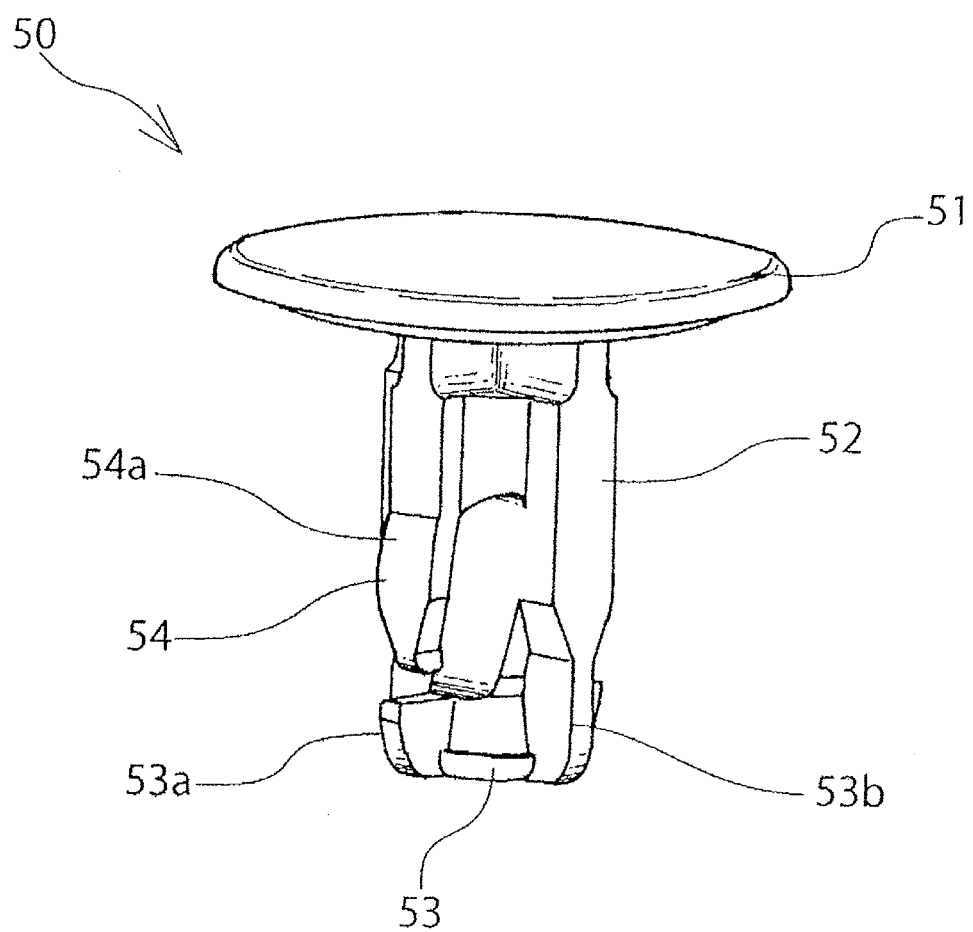
FIG. 2 is a perspective view of the pin.
Figure 3:
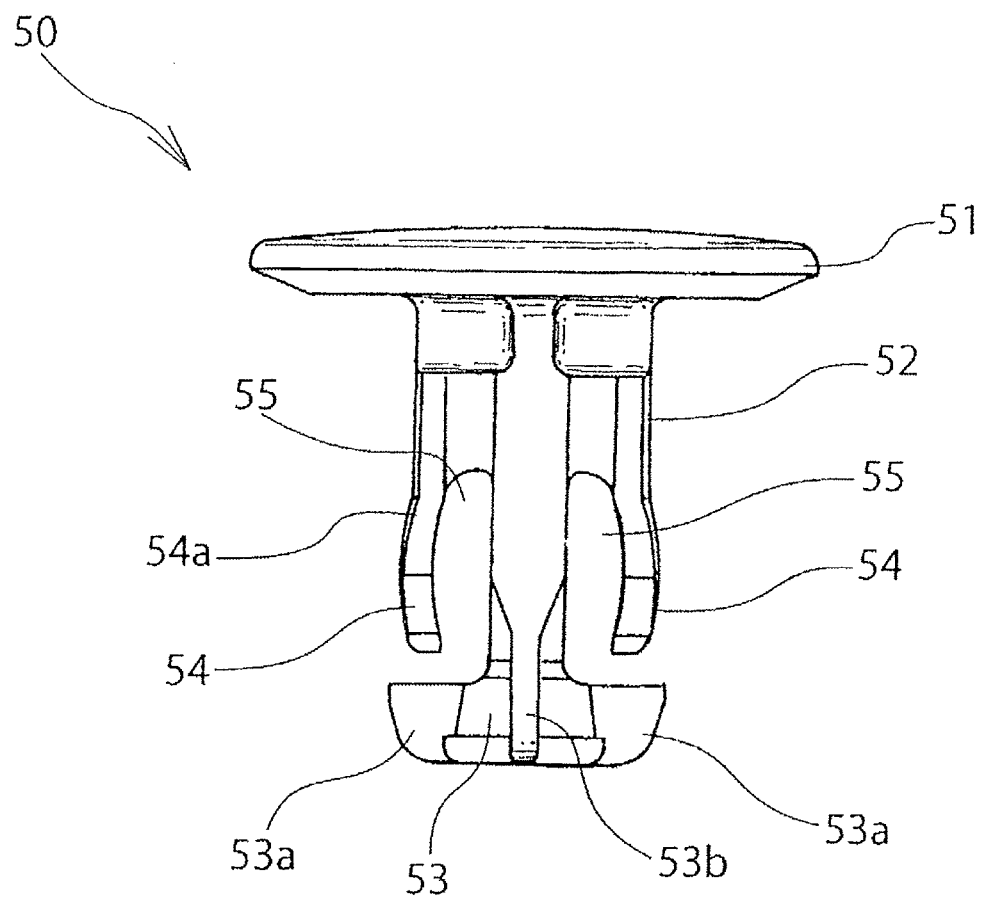
FIG. 3 is a side view of the pin.

The pin 50 has the following parts, as illustrated in FIGS. 2 and 3.

(1) Head Part 51
(2) Shaft Part 52
(3) Large-Diameter Part 53
(4) Provisional Fastening Part 54

The parts of the pin 50 are not limited to the abovementioned (1) to (4).

(Flange Part 41)

The flange part 41 is formed in a disk shape as illustrated in FIGS. 4 and 5, and its outer diameter is set larger than the inner diameter of the installation hole 21 on the fastened member 20 (see FIGS. 12 and 13).

Figure 7:
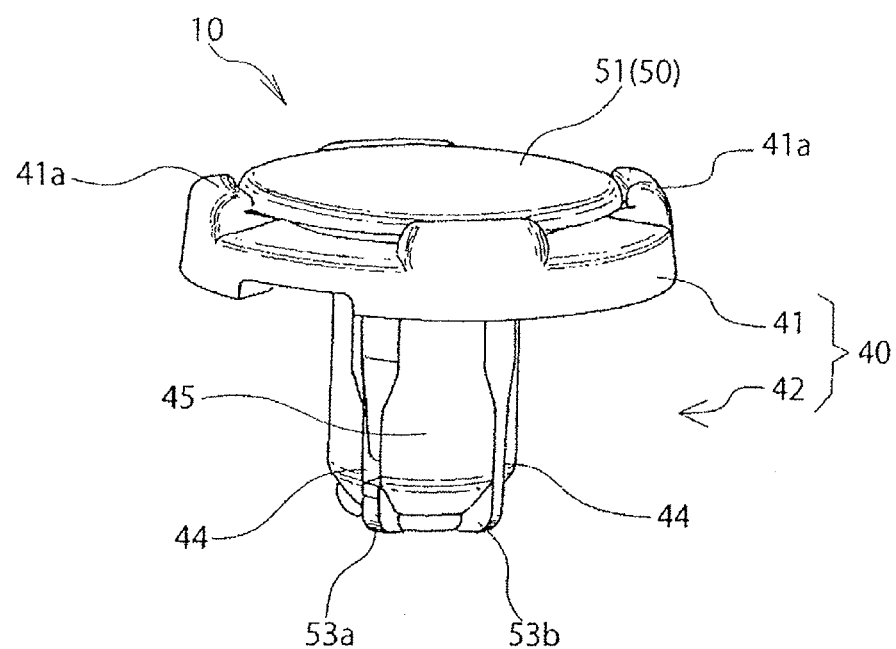
FIG. 7 is a perspective view of a state in which the pin is fully fastened.

A plurality, for example, four projecting edge parts 41a is provided on the perimeter of the upper face of the flange part 41 to project upwardly radially centered on the insertion hole 43 to be described, as illustrated in FIG. 4. The four projecting edge parts 41a are arranged in an annular form, and the head part 51 of the pin 50 to be described is inserted inside, as illustrated in FIG. 7. The four projecting edge parts 41a are formed to a height almost equal to the thickness of the head part 51. The four projecting edge parts 41a are used for preventing the pin 50 from escaping when an external force is unexpectedly applied to the head part 51.

Although four is given as an example of the number of projecting edge parts 41a, the invention is not limited to this, and the number may be one, or two or three, or five or more.

(Leg Part 42)

The leg part 42 extends in cylindrical form from the lower face of the flange part 41, as illustrated in FIGS. 4 and 5. The outer diameter of the leg part 42 is set to equal to or less than the inner diameters of the two installation holes 21 and 31.

(Insertion Hole 43)

The insertion hole 43 runs through the leg part 42 from the flange part 41, and allows insertion of the pin 50 to be described, as illustrated in FIGS. 1, 4, and 5. The insertion hole 43 is formed in a circular shape in section, and the upper and lower faces are open.

Also, a total of four key slots 43a and 43b are provided on the insertion hole 43, extending radially from the center, for example, in a "+" (plus) shape, as illustrated in FIG. 4. The four key slots 43a and 43b are arranged with a phase difference of 45 degrees with the four projecting edge parts 41a. That is, the key slots 43a and 43b are positioned in the spaces between adjacent projecting edge parts 41a.

Two opposing first key slots 43a among the four key slots 43a and 43b are cut in deeply.

The other two second key slots 43b are cut in shallowly compared with the first key slots 43a.

Although four is given as an example of the number of key slots 43a and 43b, the invention is not limited to this, and the number may be two or three, or five or more.

(Slits 44)

The slits 44 divide the leg part 42 into a plurality of divided pieces 45 capable of expanding, as illustrated in FIGS. 4 and 5.

The slits 44 divide the head part 42 into four divided pieces 45, extending radially from the center of the leg part 42, for example, in a "+" (plus) shape. The positions of the slits 44 are arranged to coincide with the positions of the key slots 43a and 43b.

Although four is given as an example of the number of slits 44, the invention is not limited to this, and the number may be two or three, or five or more. Also, although four is given as an example of the number of divided pieces 45, the invention is not limited to this, and the number may be two or three, or five or more.

(Divided Pieces 45)

The divided pieces 45 are formed between adjacent slits 44, the upper end parts are connected to the lower face of the flange part 41 and serve as hinges, and the tip parts, being the lower end parts, serve as free end parts, as illustrated in FIGS. 4 and 5.

A thick part 45a is formed on the tip part, being the lower end part of the divided piece, gradually increasing in thickness going toward the tip part, as illustrated in FIG. 1. The inside face of the thick part 45a is inclined diagonally so that the inner diameter of the insertion hole 43 is gradually narrowed toward the tip part, that is, the inner diameter tapers off. An internal projection 45b is provided on the lower end part of the diagonal on the inside face of the thick part 45a to project in a trapezoidal shape in section into the insertion hole 43.

(Elastic Projecting Edge Part 46)

The elastic projecting edge part 46 is used for elastically contacting with the provisional fastening part 54 of the pin 50 to be described, and provisionally fastening in a state in which the shaft part 52 of the pin 50 is inserted shallowly into the insertion hole 43, as illustrated in FIGS. 1, 4, and 5.

Specifically, the elastic projecting edge part 46 is positioned on the depth side of the second key slot 43b cut in shallowly. A circular cutout part 47 is formed on the outer perimeter of the elastic projecting edge part 46, running through the upper and lower faces of the flange part 41. The elastic projecting edge part 46 is therefore positioned between the second key slot 43b and the cutout part 47, and curves in a circular form so as to bend toward the cutout part 47.

(Head Part 51)

The head part 51 is formed in a disk shape as illustrated in FIGS. 2 and 3, and its outer diameter is set larger than the outer diameter of the insertion hole 43 (see FIGS. 12 and 13).

(Shaft Part 52)

The shaft part 52 extends from the lower face of the head part 51 as illustrated in FIGS. 2 and 3, and is used for expanding the divided pieces 45 by being inserted into the insertion hole 43 as illustrated in FIG. 12.

Also, the total length of the shaft part 52 is set so that the end faces of tip parts of the divided pieces 45 and the end face of the tip part, being the large-diameter part 53 to be described, of the shaft part 52 become roughly on a single plane, in a state in which the shaft part is inserted inside the insertion hole 43 and the divided pieces 45 are caused to expand, as illustrated in FIG. 12.

(Large-Diameter Part 53)

Figure 10:
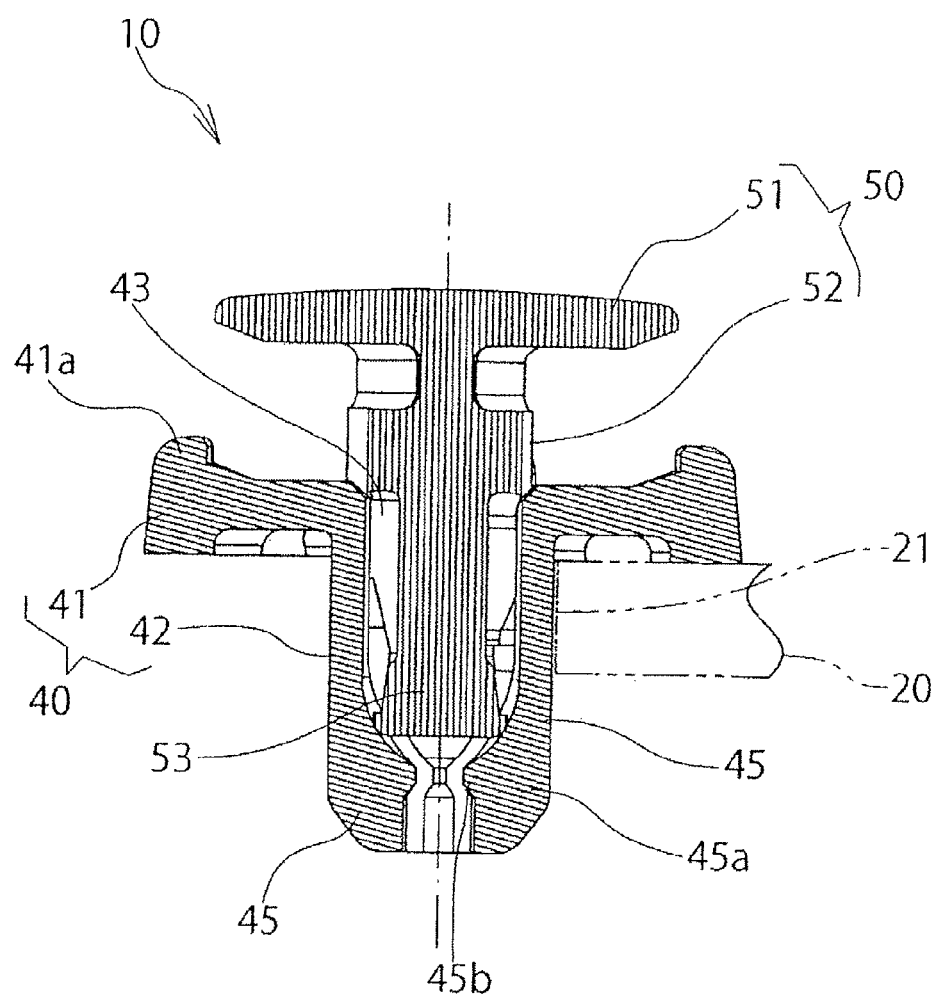
FIG. 10 is a cross-sectional view along the line 10-10 in FIG. 9.
Figure 11:
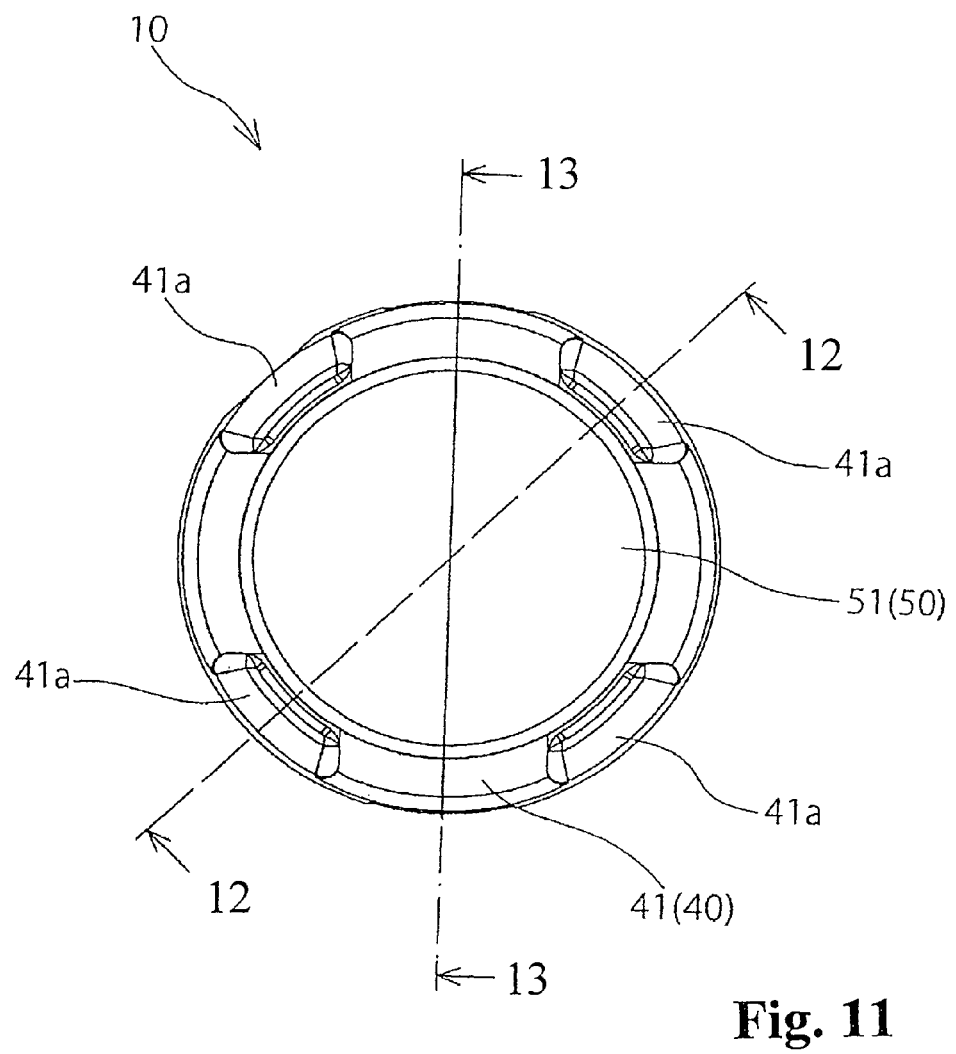
FIG. 11 is a plan view of the clip in a state in which the pin is fully fastened.

The large-diameter part 53 extends in a conical-trapezoidal shape in which the outer diameter gradually becomes larger from the tip part of the shaft part 52 as illustrated in FIGS. 2 and 3, and its outer diameter is set larger than the inner diameter of the insertion hole 43 (see FIGS. 10 and 12). The outer diameter of the shaft part 52 upward from the large-diameter part 53 is set equal to or smaller than the inner diameter of the insertion hole 43.

The large-diameter part 53 slidingly contacts the inside faces of the thick parts 45a of the divided pieces 45 and expands the divided pieces 45, as illustrated in FIGS. 10 and 12.

A total of four key projections 53a and 53b are provided on the large-diameter part 53, extending radially from the center, for example, in a "+" (plus) shape, as illustrated in FIGS. 2 and 3. Two first key projections 53a turned back to back among the four key projections 53a and 53b extend a long distance and fit into the deep first key slots 43a of the insertion hole 43 of the grommet 40. The other two second key projections 53b extend a short distance and fit into the shallow first key projections 43a of the insertion hole 43.

Also, the thickness of the four key projections 53a and 53b is set equal to or smaller than the slit width of the slits 44. The key projections 53a and 53b are therefore inserted into the slits 44 after passing through the key slots 43a and 43b of the insertion hole 43, and check rotation of the shaft part 52 of the pin 50 inside the insertion hole 43 of the grommet 40.

(Provisional Fastening Part 54)

The provisional fastening part 54 projects to curve outwardly in a radial direction from the tip part of the shaft part 52 as illustrated in FIGS. 2 and 3, and elastically contacts the inner edge part on the upper face of the opening of the insertion hole 43 (see FIG. 1).

Specifically, the upper end part of the provisional fastening part 54 is connected by a hinge part 54a at midway of the height of the shaft part 52, and the tip part, being the lower end part, is positioned slightly at a distance from the upper face of the large-diameter part 53, and serves as a free end part.

Also, a space part 55, into which the provisional fastening part 54 is allowed to bend, is provided between the inside face of the provisional fastening part 54 and the outer perimeter face of the shaft part 52, as illustrated in FIGS. 1 and 3.

A timing for release of provisional fastening, in which the provisional fastening part 54 moves away from the inner edge part of the insertion hole 43 (see FIG. 13), and a timing for expanding, in which the divided pieces 45 expand, being pushed by the shaft part 52 advancing toward a depth inside the insertion hole 43 (see FIG. 12), are set to coincide.

Although the timing for release of provisional fastening and the timing for expanding are set to coincide, that is, to be simultaneous, the invention is not limited to this, and the timing for expanding may be set to be started earlier than the timing for release of provisional fastening.

(Method of Use)

The method of use of the two-piece clip 10 having the abovementioned configuration is next described below.

(Provisionally Fastened State)

The case when provisionally fastening the pin 50 in the grommet 40 is first described, as illustrated in FIG. 1.

The shaft part 52 of the pin 50 is inserted fitting into the insertion hole 43 of the grommet 40 as illustrated in FIG. 1.

At this time, the positions of the key slots 43a and 43b of the insertion hole 43 and the key projections 53a and 53b of the shaft part 52 are arranged to coincide.

When the shaft part 52 is inserted, the large-diameter part 53 inserted into the second key slot 43b cut in shallowly contacts the elastic projecting edge part 46 positioned on the depth side of the second key slot 43b.

Here, when the shaft part 52 is pushed in forcefully, the elastic projecting edge part 46 bends in toward the cutout part 47, whereby the large-diameter part 53 advances inside the insertion hole 43.

Also, when the large-diameter part 53 passes the elastic projecting edge part 46, the elastic projecting edge part 46 returns by the elastic return force of the resin, whereby the upper face of the large-diameter part 53 and the lower face of the elastic projecting edge part 46 contact each other as illustrated in FIG. 1, and the shaft part 52 is prevented from escaping from inside the insertion hole 43.

At this time, the elastic projecting edge part 46 having returned and the provisional fastening part 54 of the pin 50 elastically contact each other as illustrated in FIG. 1. The elastic projecting edge part 46 is therefore held from above and below between the provisional fastening part 54 and the large-diameter part 53, and the pin 50 is provisionally fastened inside the insertion hole 43 of the grommet 40.

Because the shaft part 52 is in a state being inserted shallowly into the insertion hole 43 in the provisionally fastened state of the pin 50, the pin 50 can also be held by the head part 51 or the shaft part 52. The clip 10 in which the pin 50 is provisionally fastened can therefore be held easily.

(Fully Fastened State)

Full fastening, in which the fastened member 20 and the panel 30 are fastened in an overlaid state, using the clip 10 in which the pin 10 is provisionally fastened, as illustrated in FIG. 12, is next performed.

The leg part 42 of the grommet 40 is first inserted fitting into the installation hole 21 of the fastened member 20 as illustrated in FIG. 12. The leg part 42 projecting on the underside of the installation hole 21 is next inserted fitting into the installation hole 31 of the panel 30. When the leg part 42 is inserted into the installation hole 31 of the panel 30, the fastened member 20 and the panel 30 become in an overlaid state, and both installation holes 21 and 31 are aligned.

Although the clip 10 is first installed in the fastened member 20 and then installed in the panel 30, the invention is not limited to this, and the head part 42 of the grommet 40 may be inserted consecutively into both installation holes 21 and 31 upon having overlaid the fastened member 20 and the panel 30 and aligned both installation holes 21 and 31.

The pin 50 is next pushed into the insertion hole 43 of the grommet 40 as illustrated in FIGS. 12 and 13.

Figure 8:
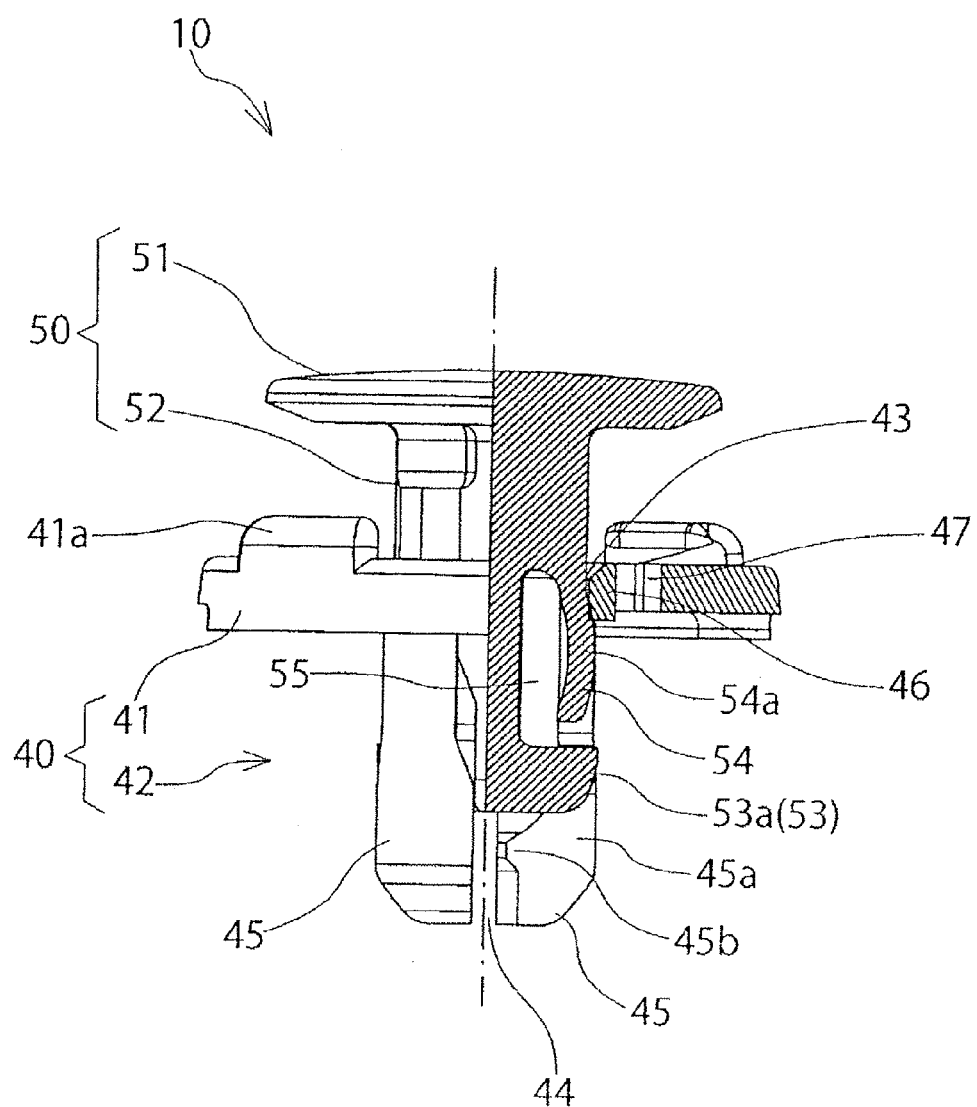
FIG. 8 is a side view of a state in which the pin is inserted more deeply, corresponding to FIG. 1.
Figure 9:
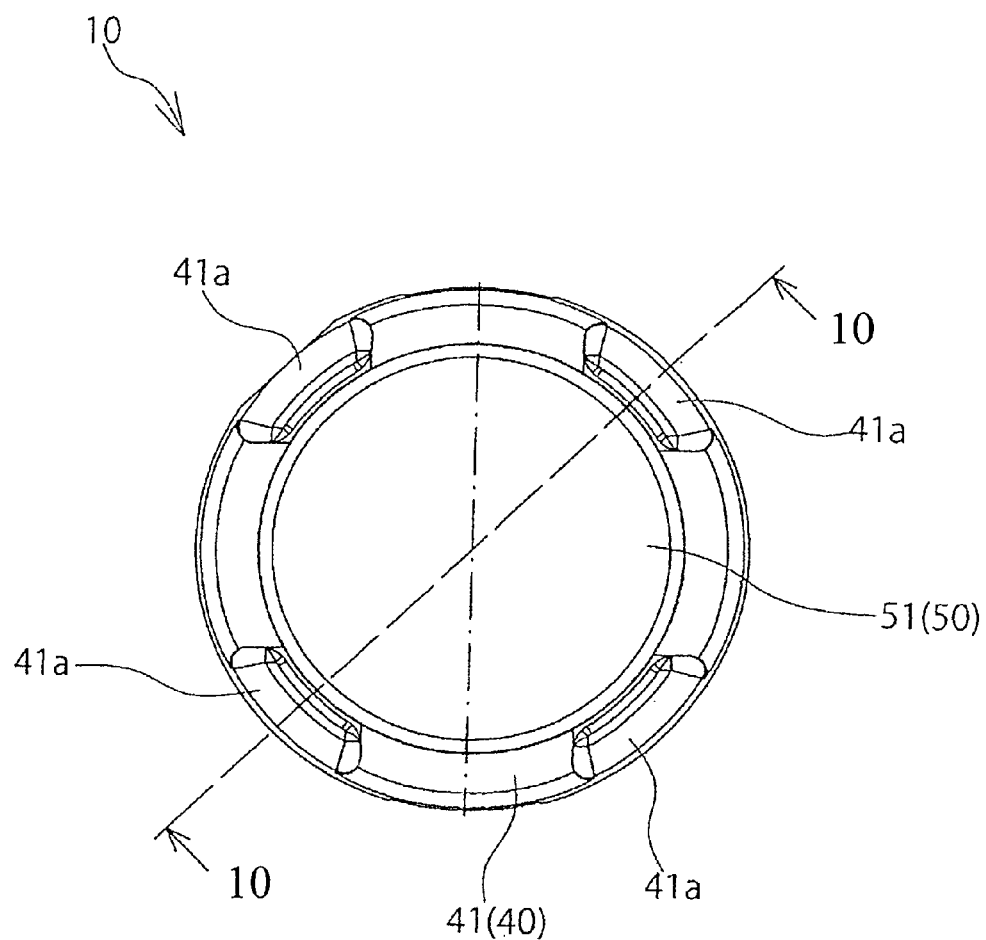
FIG. 9 is a plan view of the clip in FIG. 8.

When the pin is pushed in, the provisional fastening part 54 is pressed by the elastic projecting edge part 46 and bends in toward the space part 55. When the top of the provisional fastening part 54 is passed, the provisional fastening part 54 moves away from the elastic projecting edge part 46 (see FIG. 13) while returning by the elastic return force of the resin as illustrated in FIG. 8.

At the same time, the large-diameter part 53 of the shaft part 52 advancing toward the depth inside the insertion hole 43 contacts the inside faces of the thick parts 45a of the divided pieces 45.

Here, when the head part 51 of the pin 50 is pushed forcefully in the direction approaching the flange part 41 of the grommet 40, the inside faces of the thick parts 45a are pressed by the outside face of the large-diameter part 53, and the divided pieces 45 expand (see FIG. 12).

At this time, the divided pieces 45 expand gradually because the inside face of the thick part 45a is inclined diagonally so that the inner diameter of the insertion hole 43 is gradually narrowed going toward the tip part. Also, when the large-diameter part 53 rides past the internal projection 45b of the thick part 45a, the divided pieces 45 return by the elastic return force of the resin, whereby the large-diameter part 53 is caught on the internal projection 45b and cannot escape from the insertion hole 43, as illustrated in FIG. 12.

At this time, the lower face of the head part 51 is closely affixed to the upper face of the flange part 41 of the grommet 40.

The divided pieces 45 expand on the lower surface side of the panel 30, whereby the fastened member 20 and the panel 30 in an overlaid state are held in the space formed together with the flange part 41 contacting with the upper face of the fastened member 20, as illustrated in FIG. 12.

The fastened member 20 is therefore fastened to the panel 30 by the clip 10 as illustrated in FIGS. 12 and 13.

The entire contents of the specification, claims, drawings, and abstract of Japanese Patent Application No. 2009-166841 filed on Jul. 15, 2009 are incorporated by reference herein as a disclosure of the specification of the present invention.

What is claimed is:

1. A two-piece clip comprising:
    a grommet including a flange part; a leg part extending cylindrically from a lower face of said flange part; an insertion hole penetrating through said flange part toward said leg part; slits dividing said leg part into a plurality of divided pieces; and an elastic projecting edge part formed on an inner edge part of the insertion hole above the slits; and
    a pin inserted into the insertion hole, and including a head part having an outer diameter larger than an inner diameter of said insertion hole; and a shaft part extending from a lower face of said head part and having a large-diameter part formed with an outer diameter larger than the inner diameter of the insertion hole at one end part thereof, and a provisional fastening part formed with an upper end part extending continuously with said shaft part and a lower end part formed as a free end part and projecting to curve radially outwardly above the large-diameter part to be able to elastically contact the elastic projecting edge part,
    wherein when the pin is inserted into the insertion hole, the pin is provisionally fastened inside the insertion hole wherein the provisional fastening part and the large-diameter part hold the elastic projecting edge part, and when the pin is further inserted into the insertion hole and the large-diameter part pushes the plurality of divided pieces, the plurality of divided pieces is expanded outwardly.

2. The two-piece clip according to claim 1, further comprising a space part provided between an inside face of said provisional fastening part and an outer perimeter face of said shaft part, to bend said provisional fastening part thereinto.

3. The two-piece clip according to claim 1, wherein said shaft part has a total length such that)end faces of said plurality of divided pieces align with an end face of the large-diameter part when the pin is further inserted into the insertion hole and the large-diameter part pushes the plurality of divided pieces.

4. The two-piece clip according to claim 1, wherein the grommet further comprises a cutout part formed outside of the elastic projecting edge part to bend the elastic projecting edge part outwardly, and the cutout part penetrates through the flange part toward the leg part and extends along an outer perimeter face of the elastic projecting edge part.

5. The two-piece clip according to claim 4, wherein the insertion hole includes a first key slot and a second key slot, each radially extending therefrom, and the first key slot has a length in a radial direction of the insertion hole larger than that of the second key slot; and the elastic projecting edge part is formed adjacent to the second key slot.

6. The two-piece clip according to claim 5, wherein the large-diameter part includes a first key projection and a second key projection, each radially extending therefrom, and the first key projection has a length in a radial direction of the large-diameter part larger than that of the second key projection; and the first key projection is inserted into the first key slot and the second key slot is inserted into the second key slot.

7. The two-piece clip according to claim 5, wherein the flange part includes a projecting part formed on an upper face thereof to engage the head part of the pin; and the first key slot and the second key slot are arranged perpendicular to each other, and the projecting part is arranged with a phase difference of 45 degrees from the first and second key slots.

* * * * *